(12) United States Patent
Hsieh

(10) Patent No.: US 7,996,701 B2
(45) Date of Patent: Aug. 9, 2011

(54) AUTOMATED CLOCK RELATIONSHIP DETECTION

(75) Inventor: Ming-Tsun Hsieh, Milpitas, CA (US)

(73) Assignee: Integrated Device Technologies, Inc., San Jose, CA (US)

( * ) Notice: Subject to any disclaimer, the term of this patent is extended or adjusted under 35 U.S.C. 154(b) by 751 days.

(21) Appl. No.: 12/030,571

(22) Filed: Feb. 13, 2008

(65) Prior Publication Data

US 2009/0202030 A1  Aug. 13, 2009

(51) Int. Cl.
*G06F 1/12* (2006.01)

(52) U.S. Cl. ........ 713/501; 713/400; 713/503; 375/354; 375/371; 327/3

(58) Field of Classification Search .................. 713/400, 713/501, 503; 375/354, 371; 327/3
See application file for complete search history.

(56) References Cited

U.S. PATENT DOCUMENTS

| 5,008,904 A * | 4/1991 | Mangelsdorf et al. ........ 375/356 |
| 7,295,641 B1 * | 11/2007 | Wortman et al. ............ 375/371 |
| 7,321,978 B2 * | 1/2008 | Brodsky ........................ 713/500 |

* cited by examiner

*Primary Examiner* — Thuan N Du

(74) *Attorney, Agent, or Firm* — Tracy Parris

(57) ABSTRACT

Automated clock relationship detection may quickly and reliably detect a clock relationship with minimal latency while reducing problems due to metastability occurring at a solitary instant or extended over multiple clock periods. Automated clock relationship detection between two clocks may comprise (a) a shift register synchronizer that reduces the possibility of metastability while capturing and temporarily storing samples of the first clock in response to cycles of the second clock and (b) an evaluator that processes the samples to determine the relationship. A clock relationship detector may also determine the relationship of two clocks by arbitrating a plurality of preliminary determinations of the relationship. Delays may be applied so that each of several detectors receives a clock at a different time, which may avoid metastability in the majority of detectors. The relationship may be used to reliably determine an operating mode of logic driven by one of the clocks.

20 Claims, 5 Drawing Sheets

US 7,996,701 B2

AUTOMATED CLOCK RELATIONSHIP DETECTION

TECHNICAL FIELD

The present invention generally relates to clock signals in digital circuits. More particularly, the invention relates to automatically detecting the relationship between multiple clock signals in digital circuits.

BACKGROUND

It is sometimes necessary to detect the relationship between two clocks. For example, this may be necessary for communication between circuits that operate in different clock domains. Some circuits have multiple operating modes designed to adapt to a variety of clock frequencies. The relationship between multiple clock domains is typically determined by a detection circuit that counts and compares clock cycles of two clocks over a given time. However, counting clocks may be a slow process introducing unnecessary latency in the determination. Further, a failure to properly synchronize the clocks may cause the detection circuit to yield an inaccurate relationship. For example, due to phase alignment of two clocks that results in violation of setup and hold times of one or more components, metastability over one or more clock cycles may occur in the detection circuit, which may render the detected relationship inaccurate.

SUMMARY

This Summary is provided to introduce concepts in a simplified form. These concepts are described in greater detail below in the section entitled Detailed Description Of Illustrative Embodiments. This Summary is not intended to identify key or essential features of the claimed subject matter, nor limit the scope thereof.

The present invention provides for automated clock relationship detection for use in any device. A clock relationship detector to determine a relationship between a first clock and a second clock may comprise, for example, (a) a shift register synchronizer that reduces the possibility of metastability while it also captures and temporarily stores samples of the first clock in response to cycles of the second clock and (b) an evaluator that processes the samples to determine the relationship. A clock relationship detector may also comprise, for example, a plurality of preliminary detectors, such as the clock relationship previously mentioned, where each preliminary detector preliminarily determines the relation between the first and second clocks while an arbiter is configured to process the preliminary relationship determinations to finally determine the relationship. The relationship may be finally determined by matching a majority of the preliminarily determined relationships. Delays may be applied to the first or second clock so that each of the preliminary detectors receives the first or second clock at a different time, which may overcome metastability in the majority of preliminary detectors. The preliminary detectors may be identical. The relationship determined by a clock relationship detector may be locked at a predetermined time. The locked relationship may be resettable. The relationship detected between two clocks may be used, for example, to determine an operating mode of logic driven by the first and/or second clocks.

Automated clock relationship detection, at least in some implementations, may quickly and reliably detect a clock relationship with minimal latency while reducing the probability of, or completely overcoming, detection problems due to metastability occurring at a solitary instant or extended over multiple clock periods, as may be the case for frequency matched clocks.

BRIEF DESCRIPTION OF THE DRAWINGS

The foregoing summary, as well as the following detailed description, is better understood when read in conjunction with the accompanying drawings. For the purpose of illustrating various aspects of automated clock relationship detection, there is shown in the drawings exemplary implementations thereof. However, automated clock relationship detection is not limited to the specific implementations disclosed herein.

DETAILED DESCRIPTION OF ILLUSTRATIVE EMBODIMENTS

Figure 1:
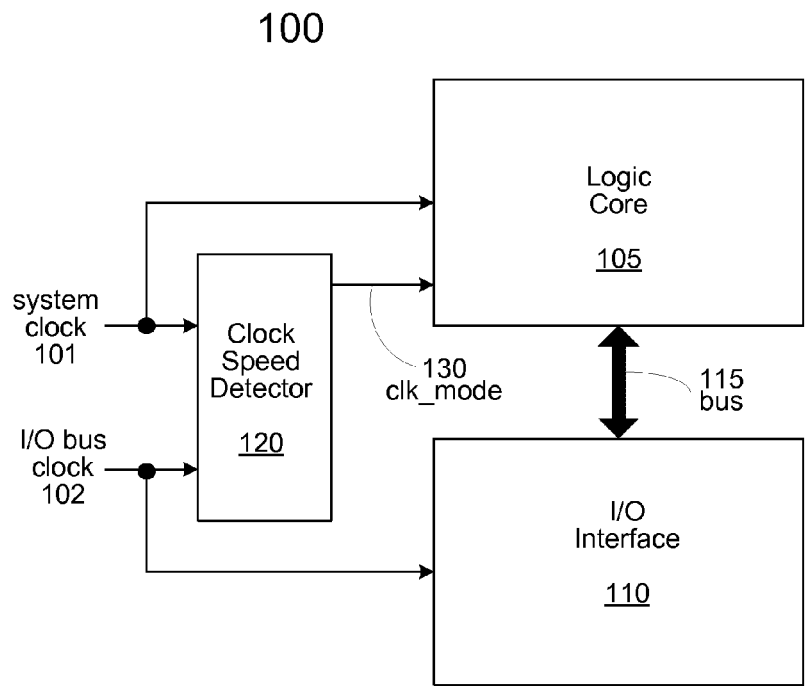
FIG. 1, in accordance with some embodiments of the invention, illustrates a block diagram of an exemplary environment in which various aspects of automated clock relationship detection can be implemented.

Reference will now be made to embodiments of the present technology for automated clock relationship detection, examples of which are illustrated in the accompanying drawings. While the technology for automated clock relationship detection will be described in conjunction with various embodiments, it will be understood that the embodiments are not intended to limit the present technology. On the contrary, the present technology is intended to cover alternatives, modifications, and equivalents, which may be included within the spirit and scope the various embodiments as defined by the appended claims. In addition, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the embodiments presented.

Unless specifically stated otherwise, terms such as "sampling", "latching", "determining", "selecting", "storing", "registering", "creating", "including", comparing, "receiving", "providing", "generating", "associating", and "arranging", or the like, refer to the actions and processes of an electronic device that manipulates and transforms data represented as physical (electronic) quantities within the electronic device.

Certain terms are used throughout the following description and claims to refer to particular system components and configurations. As one skilled in the art will appreciate, companies may refer to a component by different names. The discussion of embodiments is not intended to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection or though an indirect electrical connection via other devices and connections. Furthermore, the term "information" is intended to refer to any data, instructions, or control sequences that may be communicated between components of a device. For example, if information is sent between two components, data, instructions, control sequences, or any combination thereof may be sent between the two components.

The present invention provides for automated clock relationship detection for use in any device. A clock relationship detector to determine a relationship between a first clock and a second clock may comprise, for example, (a) a shift register synchronizer that reduces the possibility of metastability while it also captures and temporarily stores samples of the first clock in response to cycles of the second clock and (b) an evaluator that processes the samples to determine the relationship. A clock relationship detector may also comprise, for example, a plurality of preliminary detectors, such as the clock relationship previously mentioned, where each preliminary detector preliminarily determines the relation between the first and second clocks while an arbiter is configured to process the preliminary relationship determinations to finally determine the relationship. The relationship may be finally determined by matching a majority of the preliminarily determined relationships. Delays may be applied to the first or second clock so that each of the preliminary detectors receives the first or second clock at a different time, which may overcome metastability in the majority of preliminary detectors. The preliminary detectors may be identical. The relationship determined by a clock relationship detector may be locked at a predetermined time. The locked relationship may be resettable. The relationship detected between two clocks may be used, for example, to determine an operating mode of logic driven by the first and/or second clocks.

FIG. 1, in accordance with some embodiments of the invention, illustrates a block diagram of an exemplary environment in which various aspects of automated clock relationship detection can be implemented. Exemplary environment 100 may comprise one or more logic devices, internal or external components having multiple clock domains. Generally, exemplary environment 100 may comprise a first logic in a first clock domain governed by a first clock; a second logic in a second clock domain governed by a second clock; and a clock relationship detector to determine the relationship between the first and second clocks. While components 105, 110 are specific, they generally represent any two components or devices that may operate in different clock domains. As illustrated in FIG. 1, exemplary environment 100 comprises logic core 105, I/O (input/output) interface 110 and clock speed detector 120. Logic core 105 and I/O interface 110 are coupled by bus 115. Bus 115, may be an internal or external bus for communication between logic core 105 and I/O interface 110.

Logic core 105 may comprise, for example, a processor core or other logic component or device operating in a clock domain governed by system clock 101. In some embodiments, logic core 105 may comprise an Internet Protocol (IP) co-processor core. I/O interface 110 may comprise, for example, an I/O controller or other logic component or device in a clock domain governed by I/O bus clock 102. Logic core 105 may, for example, utilize I/O interface 110 as a controller for communications with external components or devices. In some embodiments, logic core 105, I/O interface or other components or devices may have multiple operating modes or variable functionality that depend, at least in part, on the relationship between clocks 101, 102.

Figure 2:
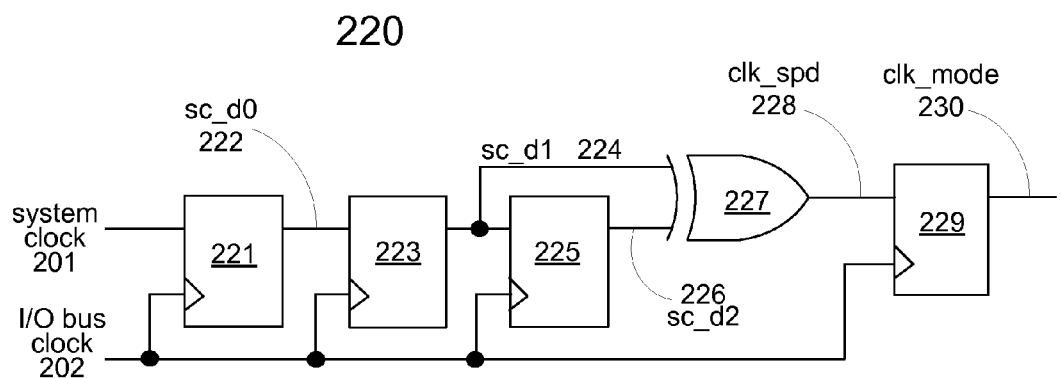
FIG. 2, in accordance with some embodiments of the invention, illustrates an exemplary implementation of automated clock relationship detection.
Figure 6:
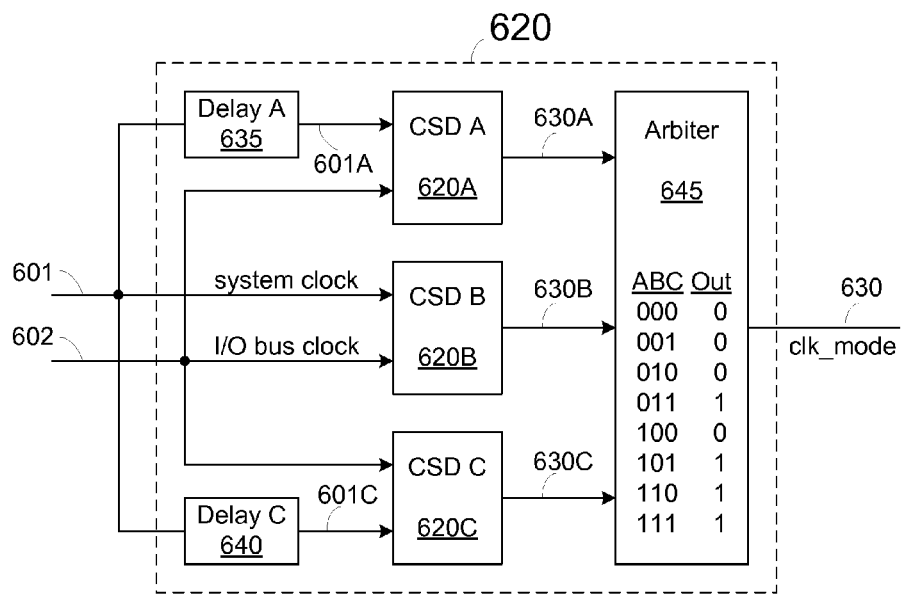
FIG. 6, in accordance with some embodiments of the invention, illustrates an exemplary implementation of automated clock relationship detection.
Figure 8:
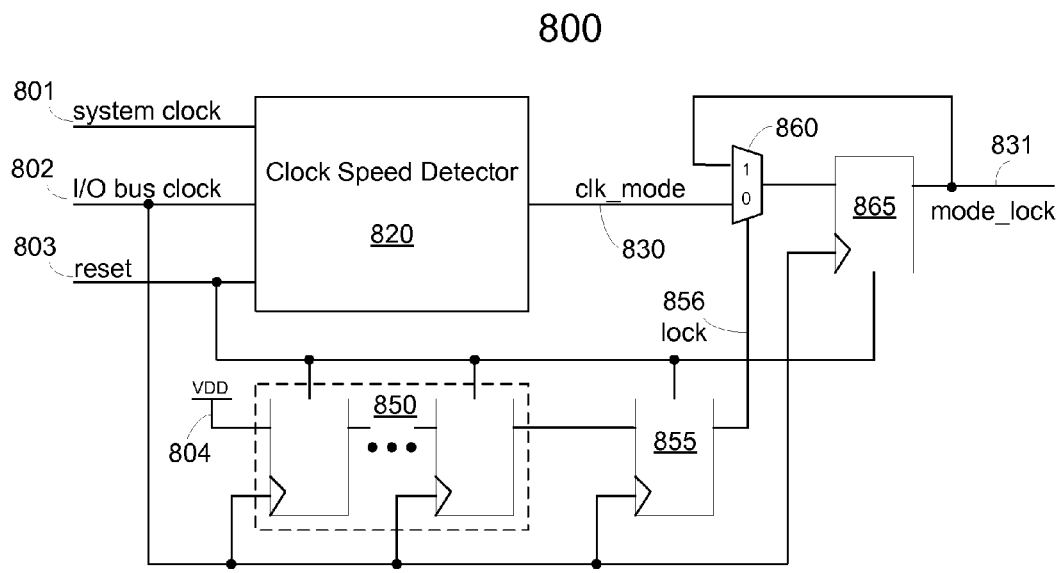
FIG. 8, in accordance with some embodiments of the invention, illustrates an exemplary implementation of automated clock relationship detection.

Clock speed detector 120 may comprise, for example, clock speed detectors 220, 620 or 800 shown in FIGS. 2, 6 and 8. Clock speed detector 120 receives both system clock 101 and I/O bus clock 102. Clock speed detector 120 processes clocks 101, 102 to determine the relationship between them. In some embodiments the relationship being determined is the difference, if any, in the frequency or speed of clocks 101, 102. Clock speed detector 120 provides its determination of the relationship to logic core 105 via signal clk_mode 130. In other embodiments, clock speed detector 120 may provide clk_mode 130 to either or both logic core 105, I/O interface 110 or any other component that may utilize the relationship.

FIG. 2, in accordance with some embodiments of the invention, illustrates an exemplary implementation of automated clock relationship detection. A clock relationship detector comprises, for example, a shift register synchronizer configured to capture and shift a plurality of samples of a first clock in response to cycles of a second clock; and an evaluator configured to process at least two samples from the plurality of samples to determine the relationship between the first and second clocks. In an exemplary embodiment, clock speed detector 120 comprises clock speed detector 220. In the embodiment shown in FIG. 2, clock speed detector 220 is configured to determine whether I/O bus clock 202 is one time (1×), i.e., the same, or two times (2×), i.e. double, the frequency (i.e. speed) of system clock 201. In other embodiments, other speed or other clock relationships may be determined.

Clock relationship detector 220 comprises flip flops 221, 223, 225, 229 and exclusive or (XOR) gate 227. In some embodiments, flip flops 221, 223, 225, 229 may comprise delay (D) flip flops while in other embodiments they may comprise other varieties of flip flops. Flip flops 221, 223, 225 are series or cascade connected and are driven by the same clock. Flip flops 221, 223 and 225 together form a shift register and multi-stage synchronizer, which is collectively referred to herein as a shift register synchronizer. The shift register synchronizer (e.g. flip flops 221, 223, 225) is configured to capture and shift a plurality of samples of a first clock, e.g. system clock 201, in response to cycles of the second clock, e.g. I/O bus clock 202.

The shift register synchronizer formed by flip flops 221, 223, 225 is driven by cycles of I/O bus clock 202. In general, the faster clock is used to drive (i.e. clock) the shift register synchronizer while the slower clock is sampled. In some embodiments, flip flops 221, 223, 225 are driven by a rising edge of I/O bus clock 202 while in others they may be driven by a falling edge, both the rising and falling edge or high and/or low levels of I/O bus clock 202. For purposes of discussion, it is presumed that flip flops 221, 223, 225 are driven by the rising edge of I/O bus clock 202.

On a first rising edge of I/O bus clock 202, flip flop 221 captures a first sample of system clock 201. On a second rising edge of I/O bus clock 202, the first sample is shifted into flip flop 223 and flip flop 221 captures a second sample of system clock 201. On a third rising edge of I/O bus clock 202, the first sample is shifted into flip flop 225, the second sample is shifted into flip flop 223 and flip flop 221 captures a third sample of system clock 201. This sequence of capturing and shifting samples continues so long as I/O bus clock 202 is actively provided to clock speed detector 220. Either or both clocks 201, 202 may be gated (not shown). Gating may be used, for example, to end needless sampling and shifting after the relationship has been detected.

The shift register synchronizer permits samples to settle on the outputs of flip flops 221, 223, 225 for one cycle of I/O bus clock 202 before they are shifted. While each additional flip flop in the shift register synchronizer decreases the likelihood of metastability, it also adds latency to the detection of the relationship. Thus, the number of flip flops in the shift register synchronizer may vary from one embodiment to the next depending on performance requirements and the possible relationships between clocks 210, 202. In general, closely aligned speed relationships such as 1× and 2× are more likely to result in metastability that is recurring or extended (i.e. lasting more than one clock cycle).

XOR gate 227 forms a simple evaluator configured to process at least two samples from the plurality of samples captured and shifted by the shift register synchronizer in order to determine the relationship between the two clocks, i.e., system clock 201 and I/O bus clock 202. While two samples are provided to evaluator XOR gate 227, i.e., sc_d1 224 and sc_d2 226, in other embodiments more than two samples may be provided to an evaluator. In the embodiment shown in FIG. 2, sample sc_d0 is not used to determine the relationship between clocks 201, 202. In other embodiments the evaluator may be more complex depending on the number of samples being processed and the possible clock relationships.

As shown in FIG. 2, each sample provided to XOR gate 227, i.e., sc_d1 224 and sc_d2 226, is shifted at least once by the shift register synchronizer. The sample represented by sc_d2 226 is shifted a first time from flip flop 221 to flip flop 223 and is shifted a second time from flip flop 223 to flip flop 225 before being provided to evaluator XOR gate 227. The sample represented by sc_d1 224 is shifted once from flip flop 221 to flip flop 223 before being provided to evaluator XOR gate 227. While sample sc_d2 226 is shifted twice and sample sc_d1 224 is shifted once prior to evaluation, in other embodiments samples may be shifted an equivalent number of times before evaluation. However, this may result in additional latency in detection of the relationship. While samples sc_d2 226 and sc_d1 224 are consecutive samples captured during consecutive cycles of I/O bus clock 202, other embodiments may utilize non-consecutive samples. So long as I/O bus clock 202 is provided to clock speed detector 120, two consecutive samples are provided to evaluator XOR gate 227 for processing. Either or both clocks 201, 202 may be gated to effectively disable the operation of clock speed detector 220 following detection of their relationship.

Evaluator XOR gate 227 processes, i.e., by operation of well-known exclusive or logic, samples sc_d1 224 and sc_d2 226 to determine the speed relationship between clocks 201, 202. The speed relationship is indicated by the output of XOR gate 227, which is clk_spd 228. When samples sc_d1 224 and sc_d2 226 are the same, i.e., either both low or both high, then clk_spd 228 will be low to indicate that clocks 201, 202 have the same frequency, i.e. speed. When samples sc_d1 224 and sc_d2 226 are different, i.e., one high and one low, then clk_spd 228 will be high to indicate that I/O bus clock 202 is double the frequency of system clock 201. This is shown graphically in FIGS. 3-5.

The clock speed relationship indicated by clk_spd 228 may be registered, for example, by flip flop 229. The registered relationship is provided by the output of flip flop 229, which is clk_mode 230. As shown in FIG. 1, clk_mode 130 is provided to logic core 105 by clock speed detector 120. However, in some embodiments the clock relationship need not be registered. In some embodiments the relationship, e.g. clk_spd 228, or registered relationship, e.g., clk_mode 230, may be locked at a predetermined time, such as following a predetermined number of cycles of I/O bus clock 202. The lock may be resettable. An exemplary embodiment of a resettable lock is shown in FIG. 8. One or both clocks 201, 202 may also be gated to enable and disable them as desired to control clock speed detector 220. For example, disabling I/O bus clock 202 following determination of the relationship may also be used to effectively lock relationship clk_spd 228 or registered relationship clk_mode 230. Similarly any one or more of flip flops 221, 223, 225, 229 may have enable and/or reset inputs to further control clock speed detector 220. For example, disabling flip flop 225 or 229 or disabling their clock inputs could also effectively lock the relationship or registered relationship.

Figure 3:
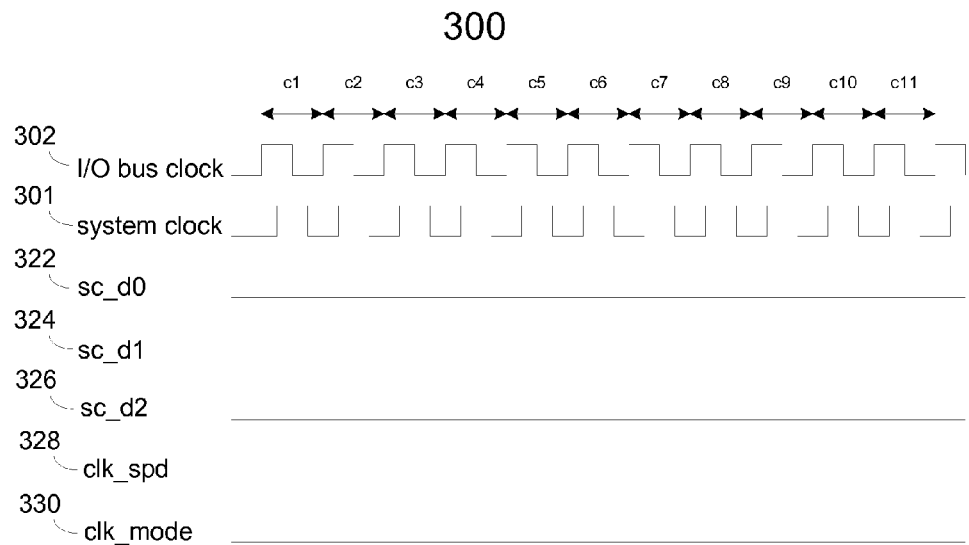
FIG. 3 illustrates an exemplary timing diagram for the exemplary implementation of automated clock relationship detection illustrated in FIG. 2.

FIG. 3 illustrates an exemplary timing diagram for the exemplary implementation of automated clock relationship detection illustrated in FIG. 2. Exemplary timing diagram 300 illustrates the operation of clock speed detector 220 for given inputs system clock 301 and I/O bus clock 302, which are collectively referred to as clocks 301, 302. As illustrated in FIG. 3, clocks 301, 302 have the same speed, i.e., I/O bus clock 302 is 1× the speed of system clock 301. However, clocks 301, 302 are out of phase. The cycles of I/O bus clock 302 are labeled c1 through c11. During each cycle c1-c11, the shift register synchronizer formed by flip flops 221, 223, 225 will capture and shift a plurality of samples of system clock 301. In view of the constant phase relationship of clocks 301, 302 shown in FIG. 3, on each rising edge of I/O clock 302, system clock 301 is low. Thus, flip flop 221 captures a low sample of system clock 301 for each clock cycle c1-c11.

As shown in FIG. 3, the output of flip flop 221, which is sc_d0 322, remains low in accordance with the low sample of system clock 301 captured on each rising edge of I/O bus clock 302. Each of these low samples represented by sc_d0 322 are shifted to flip flop 223 and then to flip flop 225. As shown in FIG. 3, the outputs of flip flops 223, 225, which are sc_d1 324 and sc_d2 326, respectively, remain low. Evaluator XOR gate 227 makes a constant evaluation of the outputs of flip flops 223, 225. Since they are the same, i.e. low, the output of XOR gate 227, which is clk_spd 328, remains low to indicate that clocks 301, 302 have the same clock speed relationship. Since clk_spd 328 remains low, the output of flip flop 229, which is clk_mode 330, remains low.

Figure 4:
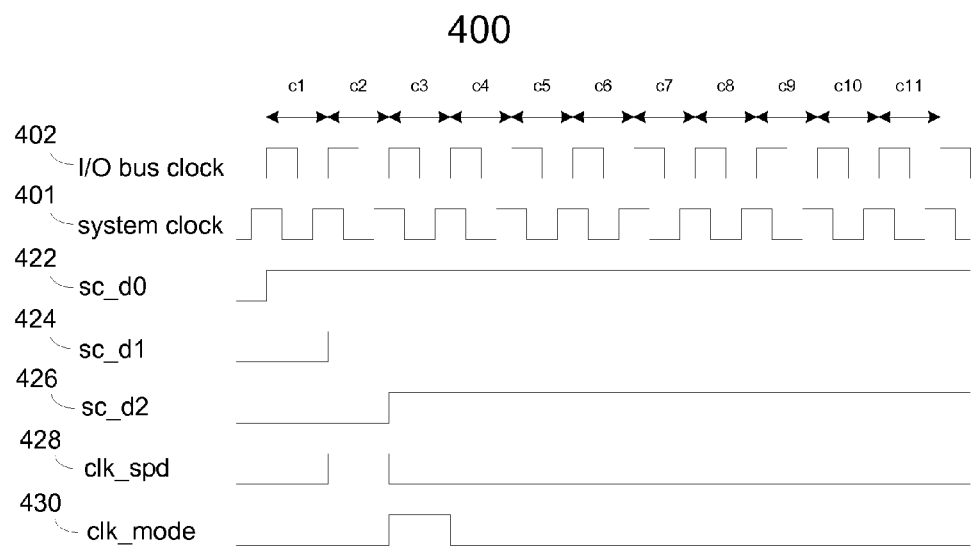
FIG. 4 illustrates an exemplary timing diagram for the exemplary implementation of automated clock relationship detection illustrated in FIG. 2.

FIG. 4 illustrates an exemplary timing diagram for the exemplary implementation of automated clock relationship detection illustrated in FIG. 2. Exemplary timing diagram 400 illustrates the operation of clock speed detector 220 for given inputs system clock 401 and I/O bus clock 402, which are collectively referred to as clocks 401, 402. As illustrated in FIG. 4, clocks 401, 402 have the same speed, i.e., I/O bus clock 402 is 1× the speed of system clock 401. However, clocks 401, 402 are out of phase. The cycles of I/O bus clock 402 are labeled c1 through c11. During each cycle c1-c11, the shift register synchronizer formed by flip flops 221, 223, 225 will capture and shift a plurality of samples of system clock 401. In view of the constant phase relationship of clocks 401, 402 shown in FIG. 4, on each rising edge of I/O clock 402, system clock 401 is high. Thus, flip flop 221 captures a high sample of system clock 401 for each clock cycle c1-c11.

As shown in FIG. 4, the output of flip flop 221, which is sc_d0 422, transitions from low to high during the first cycle c1 in response to the rising edge of I/O bus clock 402 because system clock 301 is high during the rising edge. Sc_d0 422 remains high in accordance with the high sample of system clock 401 captured on each rising edge of I/O bus clock 402. Each of these high samples represented by sc_d0 422 are shifted to flip flop 223 and then to flip flop 225. The output of flip flop 223, which is sc_d1 424, transitions from low to high during the second cycle c2 in response to the rising edge of I/O bus clock 402 because the input to flip flop 223, which is sc_d0 422, is high during the rising edge of I/O bus clock 402. Sc_d1 424 remains high in accordance with the high sample of system clock 401 captured and shifted on each rising edge of I/O bus clock 402. The output of flip flop 225, which is sc_d2 426, transitions from low to high during the third cycle c3 in response to the rising edge of I/O bus clock 402 because the input to flip flop 225, which is sc_d1 424, is high during the rising edge. Sc_d2 426 remains high in accordance with the high sample of system clock 401 captured and shifted on each rising edge of I/O bus clock 402.

Evaluator XOR gate 227 makes a constant evaluation of the outputs of flip flops 223, 225, i.e., sc_d1 424 and sc_d2 426, and outputs the clock speed relationship clk_spd 428. When sc_d1 424 and sc_d2 426 are the same, i.e., both low during the first clock cycle and both high from a point in the third clock cycle c3 forward, the output of XOR gate 227, which is clk_spd 428, is low during those times. However, sc_d1 424 and sc_d2 426 are different during clock cycle c2 when the first sample has propagated or shifted to second flip flop 223 but not yet to flip flop 225. The proper indication of the relationship between clocks 401, 402 is after clk_spd 428 settles. In this embodiment, clk_spd 428 settles low in the third cycle c3 to indicate that clocks 401, 402 have the same clock speed relationship. In this case, the latency of the clock relationship detection may be deemed three clock cycles. Flip flop 229 registers clock speed relationship clk_spd 428, which is why clk_mode 430 follows clk_spd 428 with a delay of one cycle. As a result clk_mode 430 settles one cycle after clk_spd 428 settles. In this case, the latency to register the clock speed relationship as 1× or 2× is four clock cycles.

Figure 5:
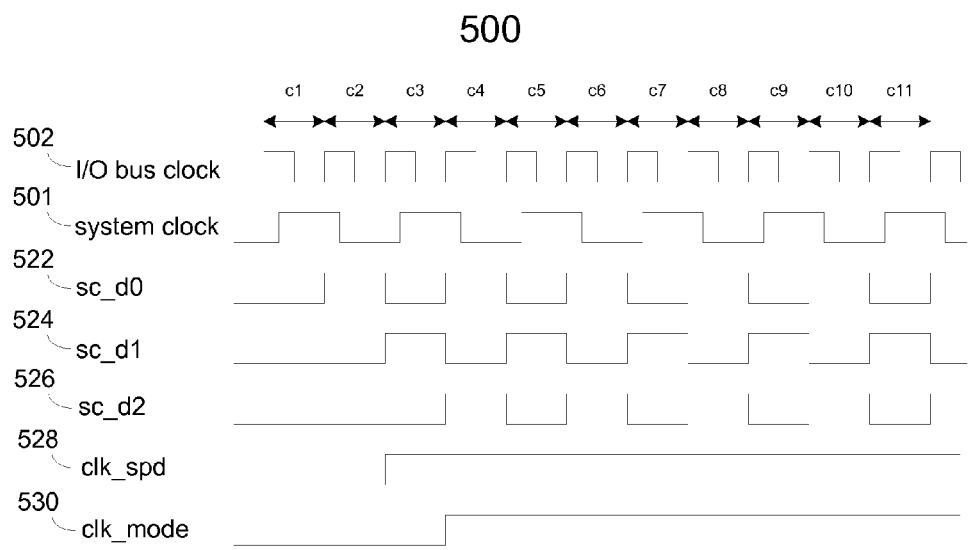
FIG. 5 illustrates an exemplary timing diagram for the exemplary implementation of automated clock relationship detection illustrated in FIG. 2.

FIG. 5 illustrates an exemplary timing diagram for the exemplary implementation of automated clock relationship detection illustrated in FIG. 2. Exemplary timing diagram 500 illustrates the operation of clock speed detector 220 for given inputs system clock 501 and I/O bus clock 502, which are collectively referred to as clocks 501, 502. As illustrated in FIG. 5, I/O bus clock 502 is twice the frequency of system clock 501, i.e., I/O bus clock 502 is 2× the speed of system clock 501. Also, clocks 501, 502 are out of phase. The cycles of I/O bus clock 502 are labeled c1 through c11. During each cycle c1-c11, the shift register synchronizer formed by flip flops 221, 223, 225 will capture and shift a plurality of samples of system clock 501. In view of the constant phase relationship of clocks 501, 502 shown in FIG. 5, system clock 501 alternates between high and low on each rising edge of I/O clock 502. Thus, flip flop 221 alternates each cycle c1-c11 between capturing a high sample and low sample of system clock 501.

As shown in FIG. 5, flip flop 221, the output of which is sc_d0 522, captures a low sample of system clock 501 during the first cycle c0 on the first rising edge of I/O bus clock 502. During the second cycle c2, on the second rising edge of I/O bus clock 502, flip flop 221 captures a high sample of system clock 501. As shown for sc_d0 522 in FIG. 5, this alternation between low and high samples continues throughout remaining cycles c3-c11. Each of these alternating low and high samples shown by sc_d0 522 are shifted to flip flop 223 and then to flip flop 225 on rising edges of I/O bus clock 501. The output of flip flop 223, i.e., sc_d1 524, is the same as sc_d0 522 with a delay of one clock cycle. The output of flip flop 225, i.e., sc_d1 526, is the same as sc_d0 522 with a delay of two clock cycles.

Evaluator XOR gate 227 makes a constant evaluation of the outputs of flip flops 223, 225, i.e., sc_d1 524 and sc_d2 526, and outputs the clock speed relationship clk_spd 528. The output of XOR gate 227, which is clk_spd 528, is low while sc_d1 524 and sc_d2 526 are the same, i.e., both low until the third rising edge of I/O bus clock 502. However, sc_d1 524 and sc_d2 526 become different during clock cycle c3 when the second (high) sample of system clock 501 has propagated or shifted to second flip flop 223 but not yet to flip flop 225. As shown in FIG. 5, sc_d1 524 and sc_d2 526 remain different, which is why clk_spd 528 only transitions once and remains high. In this embodiment, clk_spd 528 settles high in the third cycle c3 to indicate that I/O bus clock 502 is two times, i.e., 2×, the speed of system clock 501. In this case, the latency of the clock relationship detection may be deemed three clock cycles. Flip flop 229 registers clock speed relationship clk_spd 528, which is why clk_mode 530 follows clk_spd 528 with a delay of one cycle. As a result clk_mode 530 settles one cycle after clk_spd 528 settles. In this case, the latency to register the clock speed relationship as 1× or 2× is four clock cycles.

FIG. 6, in accordance with some embodiments of the invention, illustrates an exemplary implementation of automated clock relationship detection. A clock relationship detector comprises, for example, a plurality of preliminary detectors, each configured to receive and preliminarily determine the relation between first and second clocks and an arbiter configured to process the preliminary relationship determinations to finally determine the relationship between the first and second clocks. In an exemplary embodiment, clock speed detector 120 comprises clock speed detector 620. In the embodiment shown in FIG. 6, clock speed detector 620 is configured to determine whether I/O bus clock 202 is one time (1×), i.e., the same, or two times (2×), i.e. double, the frequency (i.e. speed) of system clock 201. In other embodiments, other speed relationships may be determined.

Clock relationship detector 620 comprises clock speed detector (CSD) A 620A, CSD B 620B, CSD C 620C (collectively referred to as preliminary detectors 620A-C), delay A 635, delay C 640 and arbiter 645. While there are three preliminary clock relationship detectors in the embodiment shown in FIG. 6, in other embodiments there may be more or fewer preliminary clock relationship detectors. In other embodiments, the presence and number of delays may vary. Likewise, the arbiter may be adapted to the number of preliminary clock relationship detectors in various embodiments. As illustrated in FIG. 6, clock relationship detector 620 operates to minimize or completely overcome metastability by providing three detectors 620A-C that each receive I/O bus clock 602 and system clock 601. System clock 601 is provided to each of the three preliminary detectors 620A-C at a different time, as indicated by system clock 601, first delayed system clock_A 601A, and second delayed system clock_C 601C. As such, delay A 635 is different from delay C 640. In this way, if metastability does occur, including if it recurs or occurs for more than one clock cycle, then it will only occur or recur in one of three preliminary detectors 620A-C. Preliminary detectors 620A-C each preliminarily determine the relationship between clocks 601, 602, as indicated by preliminary clock modes 630A, 630B, 630C. In some embodiments, as indicated by the logic table "ABC Out" shown in the block representing arbiter 645, arbiter 645 determines the clock relationship clk_mode 630 to match the majority of preliminary clock modes 630A-C.

Preliminary detectors 620A-C comprise a plurality of preliminary detectors, each configured to receive and preliminarily determine the relation between first and second clocks, i.e., clocks 601, 602. Each preliminary detector 620A-C may comprise, for example, clock speed detector 220, as shown in and discussed with regard to FIG. 2, to detect a 1× or 2× relationship between clocks 601, 602. In other embodiments, each preliminary detector 620A-C may comprise any detector suited to detect a plurality of possible relationships between clocks 601, 602. In some embodiments, synchronization in each preliminary detector 602A-C may not be necessary because the redundancy of preliminary detectors, delays and arbitration of preliminarily detected relationships present in clock relationship detector 620 may suffice to overcome possible metastability. However, capturing multiple samples of one of the clocks, e.g., system clock 601, is still necessary to determine the relationship between clocks 601, 602. Depending on the embodiment and potential clock relationships, a shift register may not be required to capture the number of samples necessary to determine the relationship. In some embodiments each preliminary detector 620A-C is identical while in other embodiments one or more preliminary detectors 620A-C may be different. Preliminarily determined relationships 630A, 630B and 630C provided to arbiter 645 may, but need not be registered or locked.

Delay A 635 and delay C 640 are utilized to shift system clock 601 by different time delays so that each preliminary detector 620A-C receives system clock 601 at a different time. This necessarily means delay A 635 and delay C 640 are different. Delay A 635 and delay C, as well as any other delays utilized in any other embodiment, may be implemented by any variety of delay, whether active or inactive, including trace lengths. As illustrated in FIG. 6, CSD A 620A receives a first delayed system clock system clock_A 601A, CSD C 620C receives a second delayed system clock system clock_A 601C and CSD B 620B receives system clock 601 without delay. Delay A 635 and delay C 640 may be selected based on the possible frequencies of clocks 601, 602 and the parameters, e.g., setup and hold times, of flip flops used in preliminary detectors 620A-C. For example, if I/O bus clock 602 is a 250 MHz clock with a 4 nS period, in some embodiments delay A may be a 1 nS delay while delay C may be a 2 nS delay. In other embodiments, the delays may be different. Properly selected delay A 635 and delay C 640 effectively avoid metastability problems in a majority of preliminary detectors 620A-C.

Arbiter 645 comprises an arbiter configured to process the preliminary relationship determinations to finally determine the relationship between the first and second clocks. In some embodiments, as illustrated in FIG. 6, the arbiter may finally determine the relationship to match a majority of the preliminarily determined relationships. As illustrated in FIG. 6, arbiter receives preliminarily determined relationships 630A, 630B, 630C (collectively referred to as preliminary relationships 630A-C). While arbiters may vary widely from one embodiment to the next, the functionality of arbiter 645 is illustrated in the table "ABC Out" in FIG. 6, where A, B, C, respectively represents high (i.e. 1) and low (i.e. 0) levels of preliminary relationships 630A-C and Out represents clk_mode 630. When preliminary relationships 630A-C are 000, 001, 010 or 100 then clk_mode 630 is 0, i.e. low. When preliminary relationships 630A-C are 011, 101, 110 or 111 then clk_mode 630 is 1, i.e. high. This logic finally determines the clock relationship based on the majority of preliminary relationships 630A-C. In other embodiments, arbiters may use other logic to finally determine the clock relationship in view of possible conflicts between preliminarily determined relationships. In some embodiments, preliminarily determined relationships may be weighted, as where preliminary detectors do not collect identical information or where preliminary detectors are not themselves identical.

Similar to clock relationship detector 220 in FIG. 2, the output of clock relationship detector 620 in FIG. 6, i.e., clk_mode 630, may, but need not, be registered. Also, in some embodiments the relationship or registered relationship may be locked at a predetermined time, such as following a predetermined number of cycles of I/O bus clock 202. The lock may be resettable. An exemplary embodiment of a resettable lock is shown in FIG. 8. One or both clocks 601, 602 may also be gated to enable and disable them as desired to control clock relationship detector 620. For example, disabling I/O bus clock 602 following determination of the relationship may also be used to effectively lock the relationship or registered relationship. Similarly, a flip flop used to register the relationship may have enable and/or reset inputs to further control clock relationship detector 620. Disabling a flip flop enable input or a gated clock input could be used to lock the output of the register, for example.

Figure 7:
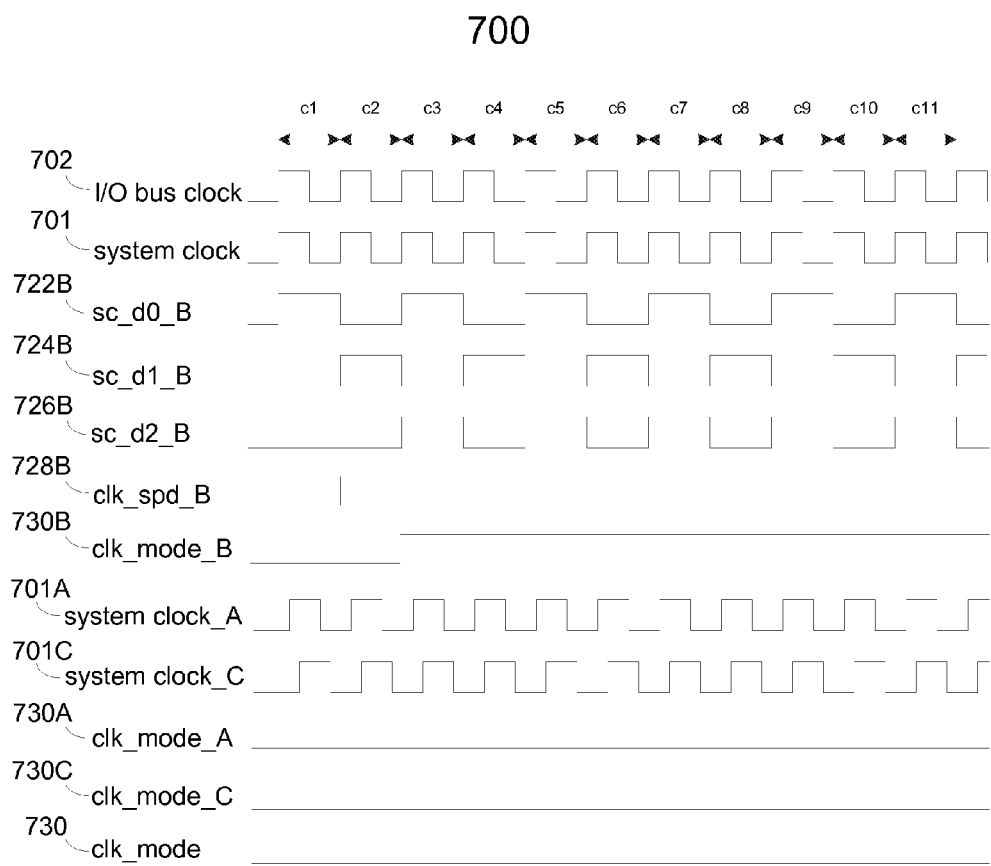
FIG. 7 illustrates an exemplary timing diagram for the exemplary implementation of automated clock relationship detection illustrated in FIG. 6.

FIG. 7 illustrates an exemplary timing diagram for the exemplary implementation of automated clock relationship detection illustrated in FIG. 6. For purposes of discussion of exemplary timing diagram 700, it is presumed that preliminary detectors 620A-C are identical, that each detector 620A-C comprises clock speed detector 220 and that delay_C is greater than delay_A. Exemplary timing diagram 700 illustrates the operation of clock relationship detector 620 for given inputs system clock 701 and I/O bus clock 702, which are collectively referred to as clocks 701, 702. As illustrated in FIG. 7, clocks 701, 702 have the same speed, i.e., I/O bus clock 702 is 1× the speed of system clock 701. Further, clocks 701, 702 are in phase, which may lead to metastability. The cycles of I/O bus clock 702 are labeled c1 through c11. During each cycle c1-c11, each preliminary detector 620A-C will capture and shift a plurality of samples of system clock 701. In view of the constant phase relationship of clocks 701, 702 shown in FIG. 7, the samples of system clock 701 captured and shifted by preliminary detector 620B may be unpredictable. However, for the sake of simplicity, preliminary detector 620B is presumed to, predictably and erroneously, generate signals representative of a 2× relationship instead of a 1× relationship between clocks 701, 702. Thus, as shown in FIG. 7, on each rising edge of I/O clock 702, clock speed detector 220 captures an alternating high then low sample of system clock 701 for each cycle c1-c11. As a result, preliminary detector 620B generates an erroneous 2× relationship clk_spd_B 728B and registers it as clk_mode_B 730B.

In contrast to preliminary detector 620B that is rendered unreliable due to metastability, preliminary detectors 620A and 620C overcome metastability due to delay A 635 and delay B 640. As shown in FIG. 7, system clock_A, which is system clock 701 delayed by delay A, and system clock_C, which is system clock 701 delayed by delay C, are out of phase with I/O bus clock 702. As such, preliminary detectors 620A and 620C generate signals similar to those in FIG. 3. On each rising edge of I/O bus clock 702, both system clock_A 701A and system clock_C 701C are low. As a result of every captured sample being low, both clk_mode_A 730A and clk_mode_C 730C remain low to indicate that the clock speed relationship between I/O bus clock 702 and system clock 701 is 1×.

Arbiter 645 receives clk_mode_B 730B, clk_mode_A 730A and clk_mode_C 730C and generates clk_mode 730. Since clk_mode_B 730B settled high, clk_mode_A 730A settled low and clk_mode_C 730C settled low, arbiter 645 generates an output in response to 010. As a result, clk_mode 630 is low, which matches a majority of preliminary detectors 620A-C indicating that the relationship between clocks 601, 602 is 1×. Clk_mode 630 may also represent a registered and/or locked relationship between clocks 701, 702.

FIG. 8, in accordance with some embodiments of the invention, illustrates an exemplary implementation of automated clock relationship detection. A clock relationship detector comprises, for example, a clock relationship detector, such as the one discussed with respect to FIGS. 2-5 and FIGS. 6-7 or other embodiment of a clock relationship detector, and a mechanism to lock the relationship. In the exemplary embodiment shown in FIG. 8, clock relationship detector 800 comprises clock speed detector 820, time delay 850, flip flops 855, 865 and multiplexer (mux) 860. Components time delay 850, flip flops 855, 865 and multiplexer (mux) 860 comprise one embodiment of a mechanism to lock the relationship determined by clock speed detector 820. In some embodiments, the time at which the detected clock relationship is locked is predetermined while in others it may be variable.

Clock speed detector 820 receives system clock 801, I/O bus clock 802 and reset 803. Clock speed detector 820 generates clk_mode 830. For purposes of discussion, it is presumed that clock speed detector 820, time delay 850 and flip flops 855, 865 are driven by I/O bus clock 802. Time delay 850 is coupled to input VDD 804, which is effectively a logic high input. Time delay 850 outputs logic high to flip flop 855 after a predetermined number of cycles of I/O bus clock 802. The output of flip flop 855 controls the output of mux 860. Mux 860 output one of tow inputs, i.e., clk_mode 830 and mode_lock 831, in response to the high or low level of the output of flip flop 855. Flip flop 865 receives and registers the output of mux 860, which is indicated by mode_lock 831.

Clock speed detector 820 has a latency associated with its detection of the relationship between clocks 801, 802. Propagation delay 850 is designed to match or exceed the latency of clock speed detector 820. In this way, at the same time or after clk_mode 830 settles on the relationship between clocks 801, 802, the last flip flop in time delay 850 outputs VDD 804 to the input of flip flop 855. In some embodiments, as shown in FIG. 8, time delay 850 comprises a shift register coupled to input VDD 804. With respect to the latency of clock speed detector 220, for example, as shown in FIGS. 3-5 the latency may be four cycles of I/O bus clock 302. Thus, on or after the fourth rising edge of I/O bus clock 802, the last flip flop in time delay 850 outputs VDD 804 to the input of flip flop 855.

A detection process to synchronize and/or sample one clock, evaluate and perhaps arbitrate or otherwise process samples to determine a preliminary and/or final relationship may begin following the application of reset, which resets all flip flops to a low state, for example. Assuming, for example, that clock speed detector 820 comprises clock speed detector 220 that settles following the fourth rising edge of I/O bus clock 802, following the fourth rising edge clk_mode 830 outputs a registered relationship of 1× or 2× and, on or after the same rising edge, time delay 850 outputs VDD 804 to the input of flip flop 855. Since the output of flip flop 855 remains low from reset until it registers VDD 804, mux 860 passes clk_mode 830 to flip flop 865. After clk_mode 830 has settled, flip flop 865 registers the settled relationship indicated by clk_mode 830. At that point, mode_lock 831 indicates the relationship indicated by clk_mode 830. Thereafter, flip flop 855 clocks in VDD 804 to change mux 860 so that the output of flip flop 865, i.e. mode_lock 831, is fed back into the input of flip flop 865. The output of flip flop 855 remains high until reset 803 is once again applied to reset all flip flops. Reset 803 makes the locked relationship resettable. Therefore, mux 860 will continuously feed back mode_lock 831 to flip flop 865 until reset 803 is applied, effectively locking mode_lock 831.

As previously mentioned, other embodiments of locking the detected relationship between clocks 801, 802 may be applied to a clock relationship detector such as clock speed detector 820. For example, either or both clocks 801, 802 may be gated (not shown) to end the detection process following settled detection. Likewise, one or more flip flops may have enable inputs or their clock inputs may be gated with an enable signal to effectively lock the relationship.

It is clear that embodiments may be implemented in one or more electronic devices or components therein. Embodiments may be implemented in hardware or a combination of hardware and software. For example, depending on the embodiment, evaluators and arbitrators may be implemented in software, although this may result in additional latency.

The inventions described herein provide numerous benefits. For example and not by way of limitation, by the inventions described herein, automated clock relationship detection, at least in some implementations, may quickly and reliably detect a clock relationship with minimal latency while reducing the probability of or completely overcoming detection problems due to metastability occurring at a solitary instant or extended over multiple clock periods.

While the present invention has been described with respect to a limited number of embodiments, those skilled in the art will appreciate numerous modifications and variations there from. It is intended that the appended claims cover all such modifications and variations as fall within the true spirit and scope of this present invention.

What is claimed is:

1. A clock relationship detector to determine a relationship between a first clock and a second clock, the clock relationship detector comprising:
    a shift register synchronizer configured to capture and shift a plurality of samples of the first clock in response to cycles of the second clock; and
    an evaluator configured to process at least two samples from the plurality of samples to determine the relationship, wherein the relationship comprises relative clock speed indicating a frequency of the first clock relative to a frequency of the second clock or vice versa.

2. The clock relationship detector in accordance with claim 1, wherein the first clock frequency is less than or equal to the second clock frequency.

3. The clock relationship detector in accordance with claim 2, wherein clock relationship detector is configured to detect whether the second clock frequency is one or two times the first clock frequency.

4. The clock relationship detector in accordance with claim 3, wherein the evaluator comprises an exclusive-or (XOR) gate.

5. The clock relationship detector in accordance with claim 1, wherein the shift register synchronizer is configured to capture and shift a plurality of samples of the first clock in response to each rising edge of the second clock.

6. The clock relationship detector in accordance with claim 1, wherein the clock relationship detector is configured to shift each of the at least two samples processed by the evaluator at least once.

7. The clock relationship detector in accordance with claim 1, wherein the clock relationship detector is configured to shift each of the at least two samples processed by the evaluator a different number of times.

8. The clock relationship detector in accordance with claim 1, wherein the clock relationship detector is configured so that the at least two samples processed by the evaluator are captured by the shift register synchronizer during consecutive cycles of the second clock.

9. The clock relationship detector in accordance with claim 1, further comprising:
a locker configured to lock the relationship determined by the evaluator after a predetermined number of cycles of the second clock.

10. A clock relationship detector to determine a relationship between a first clock and a second clock, the clock relationship detector comprising:
a plurality of preliminary detectors, each configured to receive and preliminarily determine a relationship between the first and second clocks; and
an arbiter configured to process the preliminary relationship determinations to finally determine the relationship between the first and second clocks.

11. The clock relationship detector in accordance with claim 10, wherein the clock relationship detector is configured with at least one delay to cause each preliminary detector to receive the first clock at a different time.

12. The clock relationship detector in accordance with claim 11, wherein the second clock is received by: (a) a first preliminary detector after a first delay, (b) a second preliminary detector after a second delay and (c) a third preliminary detector without delay.

13. The clock relationship detector in accordance with claim 12, wherein the arbiter finally determines the relationship to match a majority of the preliminarily determined relationships.

14. The clock relationship detector in accordance with claim 10, wherein each of the plurality of preliminary detectors are identical.

15. The clock relationship detector in accordance with claim 10, wherein each preliminary detector comprises:
a shift register synchronizer configured to capture and shift a plurality of samples of the first clock in response to cycles of the second clock; and
an evaluator configured to process at least two samples from the plurality of samples to preliminarily determine the relationship.

16. The clock relationship detector in accordance with claim 10, further comprising:
a locker configured to lock the finally determined relationship after a predetermined number of cycles of the second clock.

17. An electronic device comprising:
first logic in a first clock domain governed by a first clock;
second logic in a second clock domain governed by a second clock; and
a clock relationship detector to determine the relationship between the first and second clocks, the clock relationship detector comprising:
a plurality of preliminary detectors, each configured to receive and preliminarily determine a relationship between the first and second clocks; and
an arbiter configured to process the preliminary relationship determinations to finally determine the relationship between the first and second clocks.

18. The electronic device in accordance with claim 17, wherein the clock relationship detector is configured with at least one delay to cause each preliminary detector to receive the first clock at a different time.

19. The electronic device in accordance with claim 17, wherein the clock relationship detector is configured to lock the relationship at a predetermined time.

20. The electronic device in accordance with claim 17, wherein each preliminary detector comprises:
a shift register synchronizer configured to capture and shift a plurality of samples of the first clock in response to cycles of the second clock; and
an evaluator configured to process at least two samples from the plurality of samples to preliminarily determine the relationship.

* * * * *